United States Patent [19]

Tanaka et al.

[11] Patent Number: 4,802,037
[45] Date of Patent: Jan. 31, 1989

[54] CASSETTE HOLDING DEVICE FOR A TAPE RECORDER

[75] Inventors: Shinsaku Tanaka, Tokyo; Tadao Arata, Inagi; Takayuki Kitazawa, Yokohama, all of Japan

[73] Assignee: Tanashin Denki Co., Ltd., Tokyo, Japan

[21] Appl. No.: 55,885

[22] Filed: Jun. 1, 1987

[30] Foreign Application Priority Data

Sep. 11, 1986 [JP] Japan .................. 61-138586[U]

[51] Int. Cl.$^4$ ............................................. G11B 15/00
[52] U.S. Cl. ....................................... 360/96.5; 360/93
[58] Field of Search ...................... 360/96.5, 93, 96.6

[56] References Cited

U.S. PATENT DOCUMENTS 4,163,997  8/1979  Sugihara .................... 360/96.5
4,612,591  9/1986  Tanaka et al. ............. 360/96.5
4,628,381 12/1986  Takai ......................... 360/96.5

*Primary Examiner*—John H. Wolff
*Assistant Examiner*—Matthew J. Bussan
*Attorney, Agent, or Firm*—Wegner & Bretschneider

[57] ABSTRACT

A cassette holding device for a tape recorder wherein the shock resistance thereof can be assured sufficiently with a simple construction during transportation and during normal use of the tape recorder and protection of a cassette holder, capstan shafts and a tape cassette and reduction in cost and facility in use of the entire tape recorder can be attained. The device comprises an ejecting member which holds, when it is at advanced position, an arresting member to an advanced position in which a cassette holder can receive therein a tape cassette inserted into the tape recorder. When the arresting member is at a retracted position, the ejecting member is prevented from moving from a retracted position to the advanced position, but when the arresting member is moved form the retracted to the advanced position, the ejecting member is allowed to move from the retracted to the advanced position to eject a tape cassette from the tape recorder.

2 Claims, 9 Drawing Sheets

CASSETTE HOLDING DEVICE FOR A TAPE RECORDER

BACKGROUND OF THE INVENTION

1. Field of the Invention

This invention relates to a cassette holding device for a tape recorder.

2. Description of the Prior Art

Cassette-type tape recorders are already known, and general construction of a typical one of such tape recorders is disclosed in Japanese patent application No. 59-15676 and is shown in FIGS. 4 to 13.

Referring first to FIG. 4 which is a plan view of a tape recorder in a rest position, the tape recorder includes a main base plate 1, a pair of reel shafts 2a, 2b and a pair of capstan shafts 3a, 3b all mounted on an upper face of the base plate 1, and a tape feeding mechanism mounted on the base plate 1 and including a motor 4 for driving the shafts 2a, 2b, 3a, 3b to rotate. In particular, the motor 4 is connected to rotate the capstan shafts 3a, 3b simultaneously in a tape feeding direction while it is connected to alternatively rotate the reel shafts 2a, 2b in a tape winding direction and in a tape rewinding direction, respectively.

A recording and reproducing magnetic head 5 and a pair of pinch rollers 6a, 6b corresponding respectively to the capstan shafts 3a, 3b are also mounted on the upper face of the main base plate 1. A pivotal plate 8 is also mounted on the upper face of the main base plate 1 for pivotal motion in a vertical or up and down direction (in a direction perpendicular to a plane of FIG. 4) around an axis adjacent an upper edge in FIG. 4 of the main base plate 1. A cassette holder 9 is supported also for pivotal motion in the vertical direction (in the direciton perpendicular to the plane of FIG. 4) around an axis adjacent a pivoting end of the pivotal plate 8 (refer to FIGS. 8 and 9). The pivotal plate 8 and the cassette holder 9 are connected to each other such that, as shown in FIG. 13, an upwardly bent lug 9a of the cassette holder 9 is fitted from below into a slit 8a formed in the pivotal plate 8 while a hooked bent lug 9b of the cassette holder 9 is located for engagement from above with an end portion 8b of the pivotal plate 8.

Upward pivotal motion of the pivotal plate 8 is limited by a bent lug 10 formed at a top portion of a side wall 1c of the main base plate 1, and when the pivotal plate 8 and the cassette holder 9 are pivotally moved up and stopped by the bent lug 10, they are held substantially in a parallel position relative to the main base plate 1.

The cassette holder 9 has at a lower end side thereof in FIG. 4 (left end side in FIG. 8) a cassette admitting opening 11 through which a tape cassette 12 can be inserted into and removed from the cassette holder 9 when the cassette holder 9 is in a cassette admitting position as shown in FIG. 4. If the pivotal plate 8 is pivoted downwardly with the tape cassette 12 received in the cassette holder 9 until the cassette holder 9 reaches a cassette loaded position (that is, an operative position) as shown in FIG. 9, the tape cassette 12 is engaged with the reel shafts 2a, 2b and the capstan shafts 3a, 3b.

As the cassette holder 9 is moved from the cassette admitting position to the cassette loaded position, the magnetic head 5 is moved by the cassette holder 9 in a leftward direction in FIG. 4 to a position within the tape cassette 12 as shown in FIG. 5 in which it is engaged with a magnetic tape within the tape cassette 12. As the magnetic head 5 is moved into the tape cassette 12 in this manner, one of the pinch rollers 6a, 6b corresponding to that one of the reel shafts 2a, 2b which is then being driven by the motor 4 is brought into contact with the corresponding capstan shaft 3a or 3b with the magnetic tape interposed therebetween. In particular, if, for example, the reel shaft 2b is being driven then, the pinch roller 6b is contacted with the capstan shaft 3b with the magnetic tape interposed therebetween. Consequently, the magnetic tape is fed in one direciton and thereupon recording on or reproduction from the magnetic tape is achieved.

A spring receiving member 13 is mounted at an end thereof for pivotal motion around a shaft 14 on the upper face of the pivotal plate 8. An ejecting member 15 is mounted for sliding movement in a loading or unloading direction of the tape cassette 12 (in an upward or downward direction in FIG. 4) on the pivotal plate 8.

Referring also to FIGS. 8 and 9, the ejecting member 15 has at an end thereof (an upper end in FIG. 4) an abutting projection 16 with which the tape cassette 12 inserted into the cassette holder 9 is abutted as seen from FIG. 8. The ejecting member 15 has at the other end thereof an engaging pawl 17 for engagement with one of a pair of reel hub holes not shown of the tape cassette 12 inserted in the cassette holder 9. The ejecting member 15 further has at an upper face thereof a shoulder 19 for abutting with a swollen bridge 18 formed along an edge of the pivoting end of the pivotal plate 8 to limit movement of the pivotal plate 8 in a cassette returning or unloading direction.

Meanwhile, the spring receiving member 13 is arranged to direct its pivoting end toward the ejecting member 15. An ejecting spring 20 in the form of a torsion spring extends between the ejecting member 15 and the pivoting end of the spring receiving member 13.

Referring to FIGS. 4 to 8, an arresting member 21 in the form of a plate is mounted for pivotal motion around the shaft 14 common with the spring receiving member 13 and is located below the pivotal plate 8. The arresting member 21 has an abutting extension 22 located on an operating line of the ejecting member 15 and an arresting portion 24 located such that it may selectively engage with an upright piece 23 (refer to FIG. 9) of the main base plate 1 to arrest the cassette holder 9 to the rest or cassette admitting position. The arresting member 21 is normally urged by a spring 22a to pivot to a position in which the arresting portion 24 thereof is engaged with an upper edge of the upright piece 23 of the main base plate 1.

An ejecting operating member 25 is mounted for reciprocal movement in a leftward and rightward direction in FIGS. 10 and 11 on an outer face of the side wall 1c of the main plate 1. The ejecting operating member 25 has a bent engaging lug 26 formed at an end thereof and is connected to the spring receiving member 13 by way of a connecting bar 27. The ejecting operating member 25 is normally urged in a rightward direction in FIG. 10 by a return spring 28. When the ejecting operating member 25 is moved in the rightward direction (returning direction) by the return spring 28 as seen in FIGS. 10 and 11, the spring receiving member 13 is pivoted in a clockwise direction (returning direction) in FIGS. 4 and 5, but if the ejecting operating member 25 is pushed into the tape recorder in the leftward direction as shown in FIG. 12 against the return spring 28, the spring receiving member 13 is simultaneously pivoted in a counterclockwise direction as seen in FIGS. 6 and 7.

Referring to FIGS. 10 to 12, an operating force transmitting member 29 is mounted for back and force movement in the leftward and rightward direction in FIG. 10 on the outer face of the side wall 1c of the main base plate 1 and is located below the ejecting operating member 25. The operating force transmitting member 29 is normally urged in the rightward directly by a return spring 30. When the ejecting operating member 25 moves in the leftward direction, the operating force transmitting member 29 receives a pressing force of the ejecting operating member 25 at a pressure receiving portion 31 thereof so that it is moved in the leftward direction in an integral relationship with the ejecting member 25 as seen in FIG. 12. The operating force transmitting member 29 has a bent engaging lug 33 formed thereon.

An interlocking member 34 in the form of a plate is mounted for pivotal motion about a shaft 35 at a position forwardly of the ejecting operating member 25 and the operating force transmitting member 29 (a position leftwardly in FIG. 10) and is located on the outer face of the side wall 1c of main base plate 1. The interlocking member 34 has a connecting pin 37 secured thereto for engagement with an elongated slot 36 formed in a side wall 8c of the pivotal plate 8. The interlocking member 34 further has a pressure receiving finger 38 formed thereon for abutting with the engaging lug 26 of the ejecting operating member 25 to receive a pressing force of the ejecting operating member 25 derived from the return spring 38. The interlocking member 34 further has an engaging nose 39 and an engaging finger 40 formed thereon and located forwardly and rearwardly, respectively, of the engaging lug 33 of the operating force transmitting member 29. The interlocking member 34 is normally urged to pivot in the counterclockwise direction in FIG. 10 by a cassette holding spring 41.

Now, operation of the arrangement described above will be described. FIGS. 4, 8 and 10 show the tape recorder when no tape cassette is loaded therein. In this condition, the ejecting member 15 is at one of limit positions in which the shoulder 19 thereof is abutted with the swollen bridge 18 of the pivotal plate 8 as seen in FIG. 8 under an urging force of the ejecting spring 20 acting in the tape cassette unloading direction. Meanwhile, the cassette holder 9 is at its rest position spaced from the main base plate 1, and the arresting portion 24 of the arresting member 21 is in engagement with the upright piece 23 of the main base plate 1 to prevent movement of the cassette holder 9 to the operative position. Further, the spring receiving member 13 is at a rest position as seen in FIG. 4 to which it is pivoted in the clockwise direction (in the direction to accumulate the urging force of the ejecting spring 20) by an urging force of the return spring 28 via the connecting bar 27 and the ejecting operating member 25. In the meantime, the operating force transmitting member 29 has the engaging lug 33 thereof abutted with the engaging finger 40 of the interlocking member 34 to prevent returning movement of the operating force transmitting member 29 in the rightward direction in FIG. 10 by the return spring 30.

It is to be noted that the interlocking member 34 is urged to pivot in a direction to move the cassette holder 9 to the operative position through the engagement of the connecting pin 37 thereof with the elongated slot 36 of the pivotal plate 8 by urging forces of the return spring 30 and the cassette holding spring 41, but such pivotal motion of the interlocking member 34 is prevented by engagement of the upright piece 23 of the main base plate 1 with the arresting portion 24 of the arresting member 21 (refer to FIG. 4).

Here, if the tape cassette 12 is first inserted substantially in a parallel relationship to the main base plate 1 in the longitudinal direction into the cassette holder 9 through the cassette admitting opening 11, at first the engaging pawl 17 of the ejecting operating member 15 is brought into engagement with a reel hub hole of the tape cassette 12. Subsequently, the tape cassette 12 presses against the abutting projection 16 of the ejecting member 15 which is located on the insertion line of the tape cassette 12 so that the ejecting member 15 is moved in the cassette loading direction against the ejecting spring 20.

Thus, as the ejecting member 15 is moved in the cassette loading direction, the amount of elastic distortion of the ejecting spring 20 gradually increases, and just when the end of the ejecting spring 20 connected to the spring receiving member 13 crosses the dead center line passing the shaft 14 and the other end of the ejecting spring 20 connected to the ejecting member 15, the ejecting spring 20 is turned over so that the urging force of the ejecting spring 20 now acts to move the ejecting member 15 in the cassette loading direction. Consequently, the force by hand to push the tape cassette 12 into the tape recorder becomes unnecessary while the tape cassette 12 is drawn into the cassette holder 9 by the urging force of the ejecting spring 20.

Subsequently, the ejecting member 15 is abutted with the abutting extension 22 of the arresting member 21 to pivot the arresting member 21 in a direction opposite to the urging direction of the spring 22a. Consequently, the arresting portion 24 of the arresting member 21 is disengaged from the upright piece 23 of the main base plate 1 (refer to FIG. 5) so that the pivotal plate 8 and the interlocking member 34 are pivoted in the downward direction by the urging forces of the return spring 30 and the cassette holding spring 41. Thereupon, the cassette holder 9 is also moved down to engage the tape cassette 12 with the reel shafts 2a, 2b and the capstan shafts 3a, 3b (refer to FIG. 9).

FIGS. 5, 9 and 11 show the tape recorder when a tape cassette is loaded therein, that is, when the cassette holder 9 is in the operative position. In this condition, the engaging lug 33 of the operating force transmitting member 29 is out of engagement with the engaging finger 40 as a result of preceding counterclockwise pivotal motion of the interlocking member 34 while the operating force transmitting member 29 is returned in the rightward direction in FIG. 11 by the return spring 30.

Further, the ejecting operating member 25 is urged by the urging force of the return spring 38 to press the engaging lug 26 thereof against the pressure receiving finger 38 of the interlocking member 34, and the pressing force acts to pivot the interlocking member 34 in the counterclockwise direction to a position as shown in FIG. 11.

Meanwhile, the urging force of the ejecting spring 20 is transmitted to the ejecting operating member 25 via the connecting bar 27 and acts similarly to the return spring 28 to move the ejecting operating member 25 in the rightward direction and to pivot the interlocking member 34 in the counterclockwise direction in FIG. 11.

Further, as the cassette holder 9 is moved to the operative position, the motor 4 is activated to start rotation of one of the reel shafts, for example, the reel shaft 2b, and the capstan shafts 3a, 3b in individual predetermined directions. Simultaneously, the magnetic head 5 is moved toward the tape cassette 12 into contact with a magnetic tape within the tape cassette 12 while the pinch roller 6b on the same side with the reel shaft 2b which is rotated by the driving force of the motor 4 is contacted with the corresponding capstan shaft 3b with the magnetic tape interposed therebetween, thereby attaining a recording or reproducing condition.

When the tape recorder is to be stopped and the tape cassette 12 is to be removed from the tape recorder, the ejecting operating member 25 may be pushed into the tape recorder as shown in FIG. 6. In this instance, the ejecting operating member 25 presses against the pressure receiving portion 31 of the operating force transmitting member 29 to move the operating force transmitting member 29 in the same direction as shown in FIG. 12. Consequently, the engaging lug 33 of the operating force transmitting member 29 presses against the engaging nose 39 of the interlocking member 34 to pivot the interlocking member 34 in the clockwise direction as shown in FIG. 12. Consequently, the pivotal plate 8 is pivoted in the counterclockwise direction whereupon the cassette holder 9 is lifted to the rest position to move the tape cassette 12 upwardly out of engagement with the reel shafts 2a, 2 b and the capstan shafts 3a, 3 b.

On the other hand, as the ejecting operating member 25 is pushed in, the spring receiving member 13 is pivoted in the counterclockwise direction as shown in FIG. 6 via the connecting bar 27. During such counterclockwise pivotal motion of the spring receiving member 13, just when the end of the ejecting spring 20 connected to the spring receiving member 13 moves across the dead center line provided by the shaft 14 and the other end of the ejecting spring 20 connected to the ejecting member 15, the ejecting spring 20 is turned over so that the urging force of the ejecting spring 20 now acts to move the ejecting member 15 in the cassette unloading direction. Consequently, the ejecting member 15 is moved back to the rest position at which the shoulder 19 of the ejecting member 15 is abutted with the swollen bridge 18 of the pivotal plate 8. By such movement of the ejecting member 15 in the cassette unloading direction, the tape cassette 12 is pushed out from the cassette admitting opening 11 as shown in FIG. 7. Meanwhile, the arresting member 21 is pivoted back in the clockwise direction in FIG. 7 by the force of the spring 22a to cause the arresting portion 24 thereof to be arrested by the erected piece 23 of the main base plate 1 thereby to hold the cassette holder 9 to the rest position. Then, if the ejecting operating member 25 is released, it is returned to the position as shown in FIGS. 4, 8 and 10 by the return spring 38.

In the conventional arrangement described above, as the tape cassette 12 is inserted into the cassette holder 9, the arresting member 21 is pivoted around the shaft 14 to disengage the arresting portion 24 thereof from the upright piece 23 to allow the cassette holder 9 to move down to the operative position. However, with the construction just described, if an impact force acts upon the tape recorder from outside, the arresting member 21 may readily be pivoted in a direction as indicated by an arrow mark A in FIG. 4 around the shaft 14 to disengage the arresting portion 24 thereof from the upright piece 23. If the arresting portion 24 is disengaged from the upright piece 23 in this manner, the cassette holder 9 will be moved down again as shown in FIG. 9. When the cassette holder 9 is at its moved down position in this manner, the tape cassette 12 cannot be loaded. Where the tape recorder is of a type installed in a car or the like, normally a door is provided in front of the tape cassette admitting opening 11 and accordingly when the tape cassette 12 is inserted into the cassette holder 9, the door must be pushed open by the tape cassette 12. Accordingly, it cannot be observed from outside whether or not the cassette holder 9 is at its lowered position. Consequently, the tape cassette 12 may sometimes be forced into the cassette holder 9 so that the tape cassette 12 or the cassette holder 9 may be broken.

In view of the above, such means as shown in FIG. 14 is conventionally employed for preventing such an arresting member as the arresting member 21 from being pivoted by an external impact force or by some other reasons when a tape recorder is to be transported. Referring to FIG. 14, the pivotal plate 8 and the arresting member 21 have threaded holes formed therein, respectively, and a screw 48 is screwed into the threaded holes through a cabinet 47 in order to secure the arresting member 21 relative to the pivotal plate 8.

Such means as described just above has drawbacks that the production cost rises due to expenses required for formation of threaded holes and for production and mounting and dismounting of a screw, that the means cannot be applied to a product to which a screw cannot be mounted, and that the shock resistance in a normal condition in which the screw is removed is reduced.

On the other hand, in the conventional arrangement described above with reference to FIGS. 4 to 13, the cassette holder 9 is possibly lowered again as shown in FIG. 9 by some other reason. In particular, when the tape cassette 12 is to be removed from the cassette holder 9 after completion of a recording or reproducing operation, the ejecting operating member 25 is pushed in. The force by hand to push the ejecting operating member 25 into the tape recorder is used, at one hand, as a force to move up the cassette holder 9, and at the other hand, as a force to cause turnover of the ejecting spring 20 via the connecting bar 27 and the spring receiving member 13. In this instance, if there is a mechanical play present in the two force transmitting systems, such an ideal time relationship cannot be attained that the ejecting spring 20 is turned over at a point of time when the arresting portion 24 of the arresting member 21 is arrested by the upright piece 23, but it may possibly occur that the arresting portion 24 is arrested by the upright piece 23 after the ejecting spring 20 has been turned over. If turnover of the ejecting spring 20 occurs too early in time in this manner, the tape cassette 12 will naturally be ejected before the arresting portion 24 is arrested by the upright piece 23, and accordingly if an operator stops the pushing in operation of the ejecting operating member 25 just when the tape cassette 12 is ejected, the cassette holder 9 will be moved down again as shown in FIG. 9, which may cause such problems as described hereinabove.

Further, if the ejecting spring 20 is turned over to achieve an ejecting operation before the arresting portion 24 of the arresting member 21 is arrested by the upright piece 23 as described above, such an ejecting motion is achieved before the capstan shafts 3a, 3b have not completely been drawn off the tape cassette 12.

Accordingly, there is a problem that the tape cassette may be damaged by an end of a capstan shaft or else an end portion of a capstan shaft may be damaged.

SUMMARY OF THE INVENTION

It is an object of the present invention to provide a cassette holding device for a tape recorder wherein the shock resistance thereof can be assured sufficiently with a simple construction not only during transportation but also during normal use of the tape recorder and protection of a cassette holder and a tape cassette and reduction in cost of the entire tape recorder can be attained.

It is another object of the invention to provide a cassette holding device for a tape recorder wherein a tape cassette can be ejected only after a cassette holder has been moved to a rest position thereby to assure improvements in protection of the cassette holder, capstan shafts and a tape cassette and also in facility in use of the tape recorder.

According to one aspect of the present invention, there is provided a cassette holding device for a tape recorder, comprising a cassette holder for removably receiving a tape cassette therein, said cassette holder being mounted for movement between an operative position in which recording on or reproduction from a tape within a tape cassette received therein can be achieved and a rest position, spring means for urging said cassette holder toward the operative position, an arresting member mounted on said cassette holder for back and forth movement between an advanced position and a retracted position, stationary arresting means located for engagement with said arresting member at the advanced position to arrest said cassette holder to the rest position, an ejecting member mounted for back and forth movement between an advanced position and a retracted position on said cassette holder, said ejecting member being retracted by an inserting force of a tape cassette inserted into said cassette holder to disengage said arresting member from said stationary arresting means while accumulating a spring force in said spring means, said ejecting member being advanced, when allowed, by the accumulated spring force to push back the tape cassette in a direction to unload the tape cassette, and means on said ejecting member for limiting, when said ejecting member is at the advanced position, movement of said arresting member away from the advanced position to maintain the engagement of said said arresting member with said stationary arresting means. Accordingly, even if the arresting member tends to move to the retracted position when no tape cassette is loaded in the tape recorder, such motion is always prevented by the limiting means on the ejecting member.

According to another aspect of the invention, there is provided a cassette holding device for a tape recorder, comprising a cassette holder for removably receiving a tape cassette therein, said cassette holder being mounted for movement between an operative position in which recording on or reproduction from a tape within a tape cassette received therein can be achieved and a rest position, spring means for urging said cassette holder toward the operative position, an arresting member mounted on said cassette holder for back and forth movement between an advanced position and a retracted position, stationary arresting means located for engagement with said arresting member at the advanced position to arrest said cassette holder to the rest position, an ejecting member mounted for back and forth movement between an advanced position and a retracted position on said cassette holder, said ejecting member being retracted by an inserting force of a tape cassette inserted into said cassette holder to disengage said arresting member from said stationary arresting means while accumulating a spring force in said spring means, said ejecting member being advanced, when allowed, by the accumulated spring force to push back the tape cassette in a direction to unload the tape cassette, and means for preventing, when said arresting member is at the retracted position in which said arresting member is disengaged from said stationary arresting means, movement of said ejecting member away from the retracted position toward the advanced position and for allowing, when said arresting member is advanced to the advanced position in which said arresting means engages with said stationary arresting means, movement of said ejecting member away from the retracted position to the advanced position. Accordingly, only after the arresting member has been arrested by the stationary arresting means, that is, only after the cassette holder has been arrested to the rest position, the ejecting member is allowed to advance to eject the tape cassette from the tape recorder.

The above and other objects, features and advantages of the present invention will become apparent from the following description and the appended claims, taken in conjunction with the accompanying drawing.

DESCRIPTION OF THE PREFERRED EMBODIMENT

Figure 1:
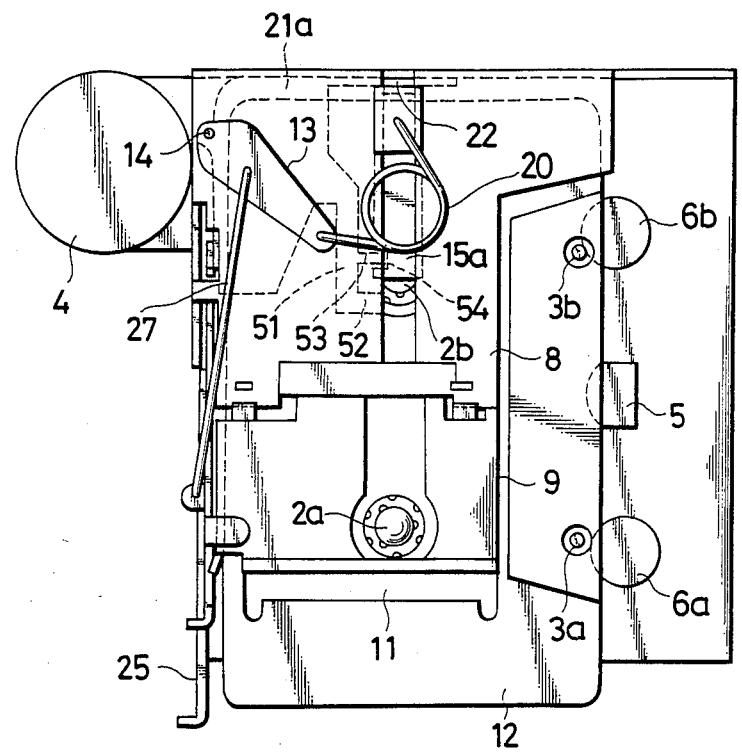
FIG. 1 is a plan view of a tape recorder showing a preferred embodiment of the present invention.
Figure 2:
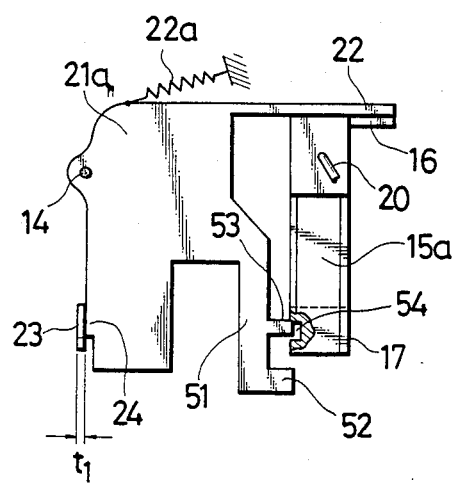
FIG. 2 is a plan view, partially in section, of part of the tape recorder of FIG. 1 when a tape cassette is loaded therein.
Figure 3:
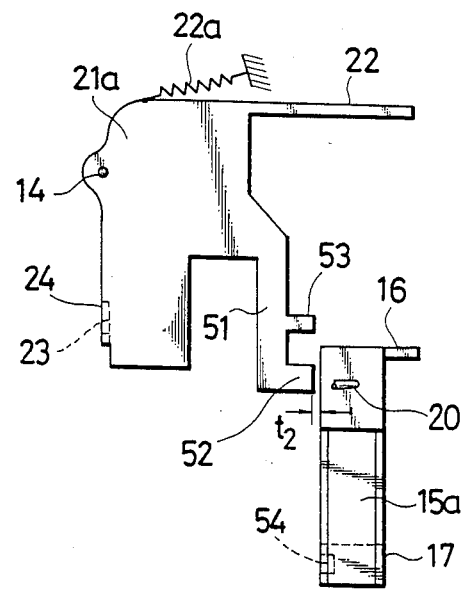
FIG. 3 is a plan view of part of the tape recorder of FIG. 1 when no tape cassette loaded therein.
Figure 4:
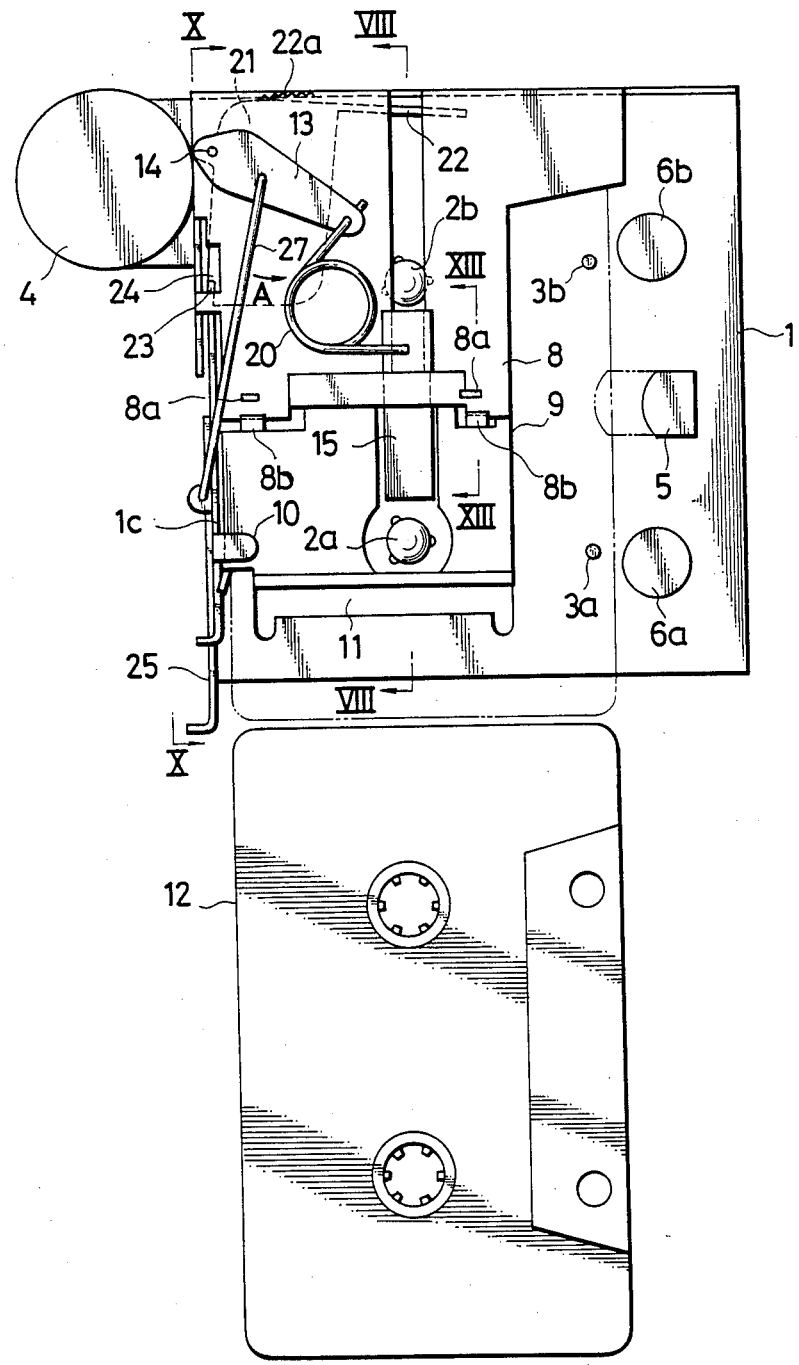
FIG. 4 is a plan view of a conventional tape recorder before a tape cassette is loaded therein.
Figure 5:
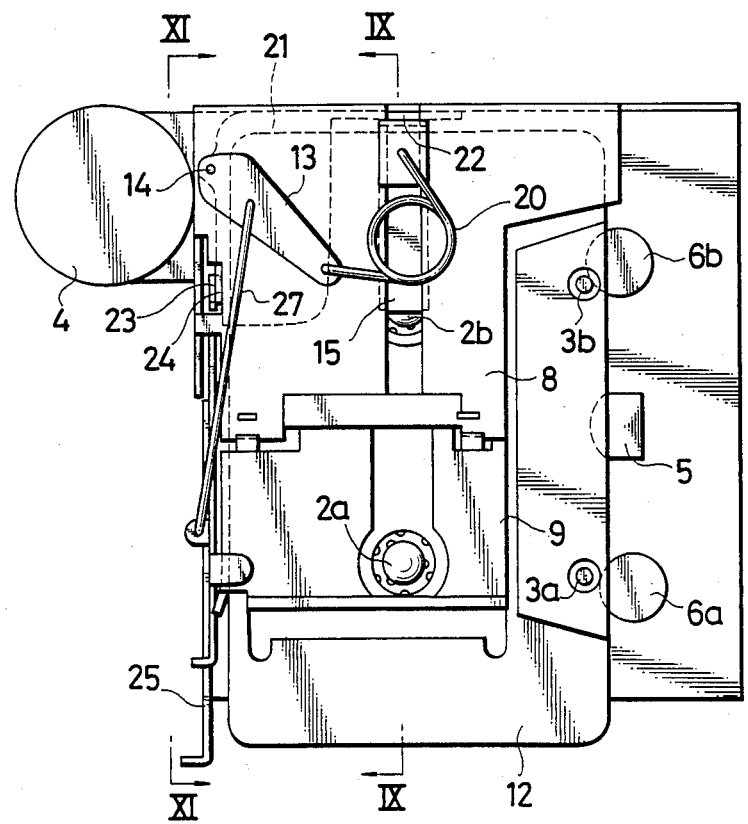
FIG. 5 is a plan view of the tape recorder of FIG. 4 in a recording or reproducing condition.
Figure 6:
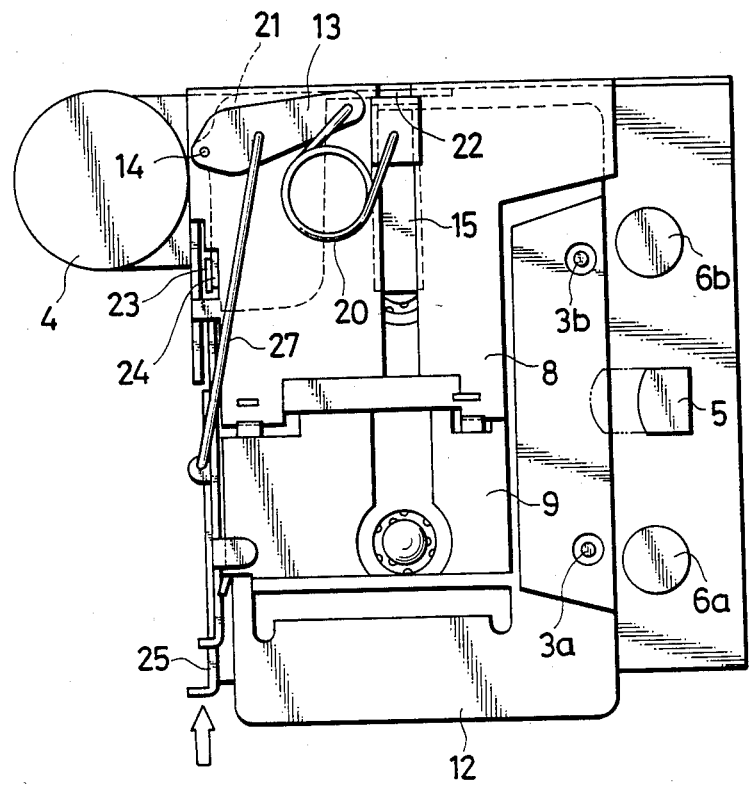
FIGS. 6 and 7 are plan views of the tape recorder of FIG. 4 at different stages when a tape cassette is unloaded therefrom.
Figure 7:
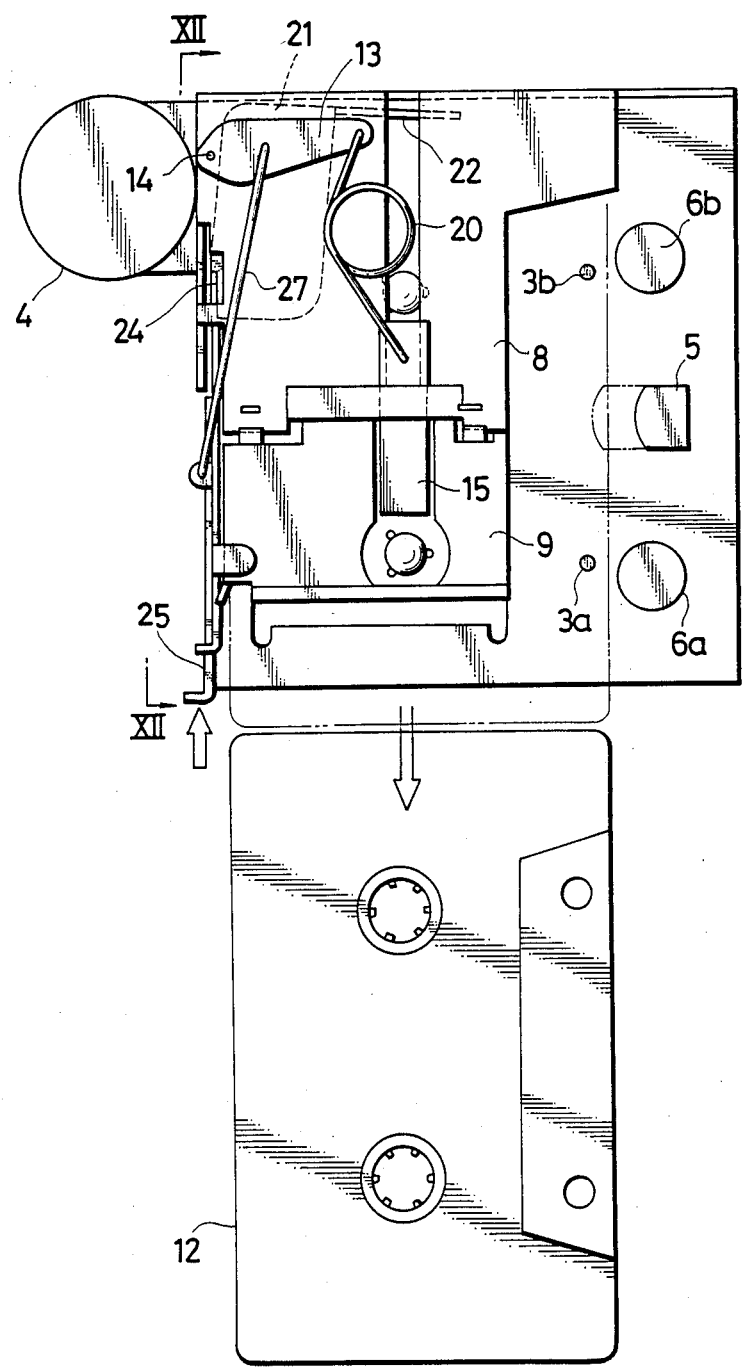
Figure 8:
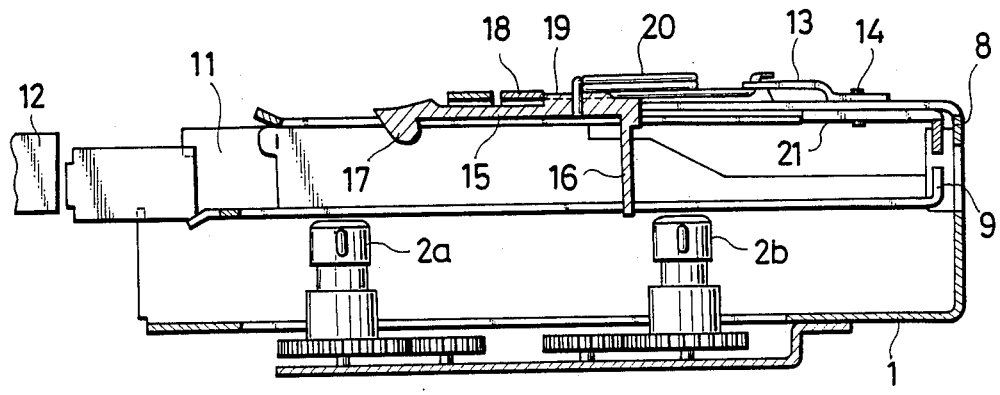
FIG. 8 is a cross sectional view taken along line VIII—VIII of FIG. 4.
Figure 9:
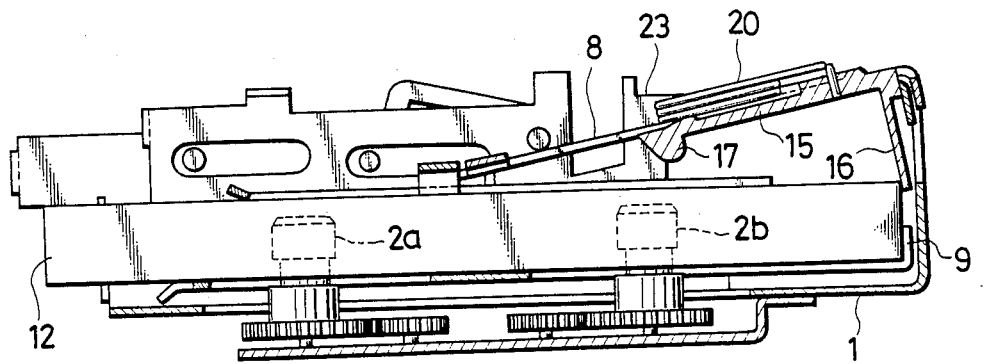
FIG. 9 is a cross sectional view taken along line IX—IX of FIG. 5.
Figure 10:
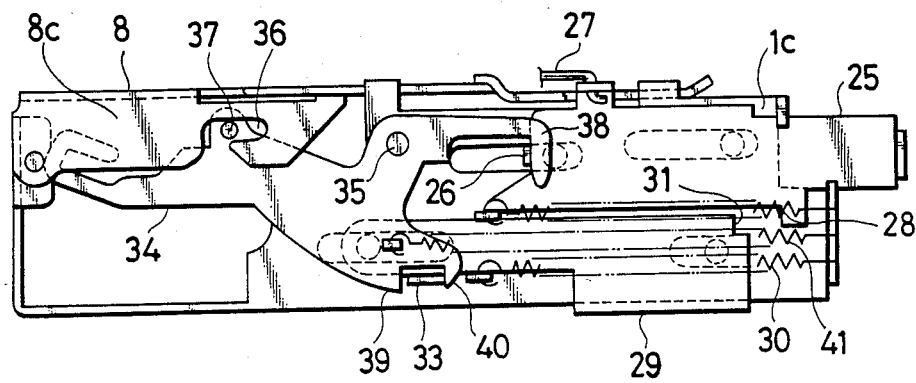
FIG. 10 is a cross sectional view taken along line X—X of FIG. 4.
Figure 11:
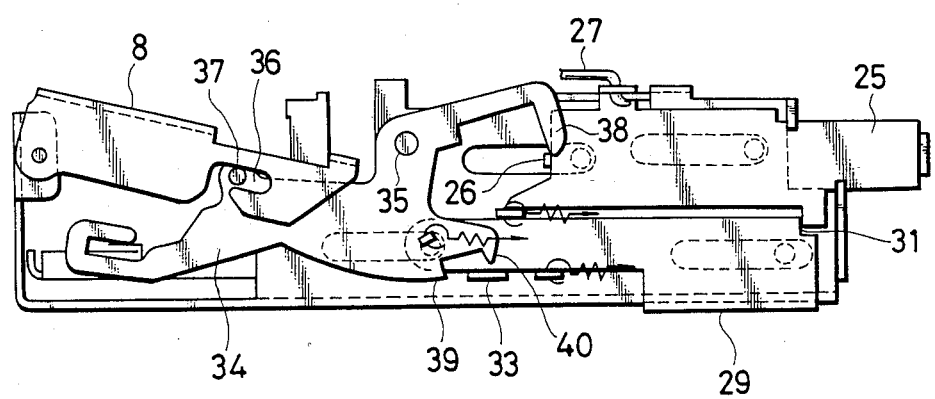
FIG. 11 is a cross sectional view taken along line XI—XI of FIG. 5.
Figure 12:
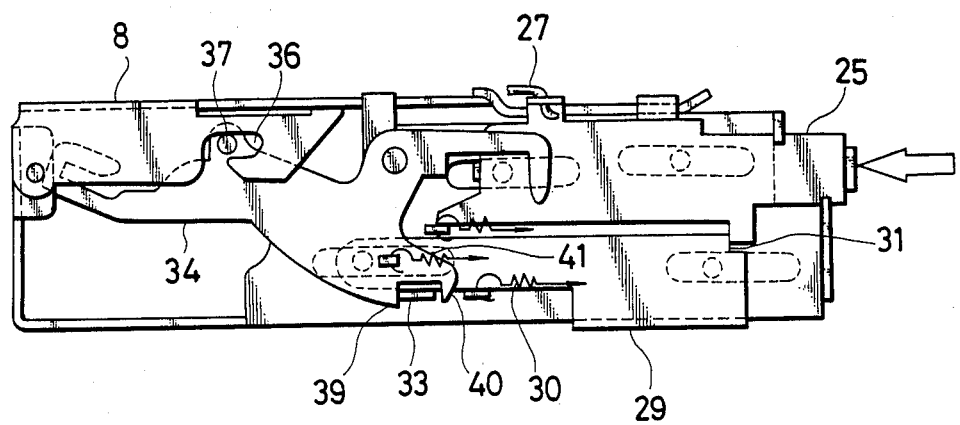
FIG. 12 is a cross sectional view taken along line XII—XII of FIG. 7.
Figure 13:
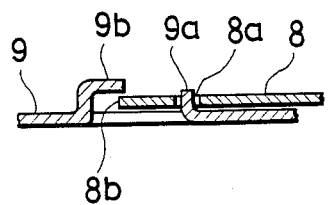
FIG. 13 is a cross sectional view taken along line XIII—XIII of FIG. 4.
Figure 14:
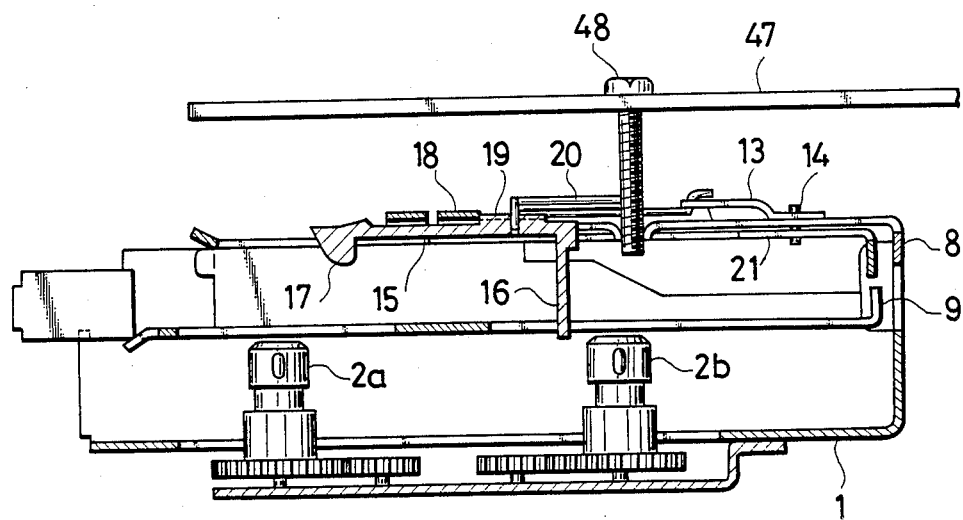
FIG. 14 is a cross sectional view of part of a tape recorder showing conventional means for preventing inadvertent movement of a cassette holder to an operative position during transportation.

Referring to FIGS. 1 to 3, like parts or elements are denoted like reference numerals or symbols to those of FIGS. 4 to 13, and detailed description thereof will be omitted herein in order to avoid redundancy.

The arrangement of the embodiment is different in structure of its arresting member denoted at 21a and also of its ejecting member denoted at 15a from the conventional arrangement described hereinabove with reference to FIGS. 4 to 13.

In particular, the arresting member 21a has an extension 51 integrally formed at a portion thereof adjacent the ejecting member 15a and extending toward the tape cassette admitting opening 11. The extension 51 of the arresting member 21a has a projection 52 formed at an end portion on a side edge thereof opposing to the ejecting member 15a and extending toward the ejecting member 15a. The extension 51 has another projection 53 formed at a portion on the same side edge thereof in a rearwardly spaced relationship by a predetermined distance from the projection 52 and extending similarly toward the ejecting member 15a. The projection 52 has a relatively large width along a direction of movement of the ejecting member 15a while the other projection 53 has a relatively small width in the same direction. Meanwhile, the engaging pawl 17 of the ejecting member 15a has a recess 54 formed at a side wall thereof opposing to the arresting member 21a and adapted to selectively receive the projection 53 therein. The recess 54 and the projections 53, 52 are dimensioned and positioned relative to one another so as to meet a following relationship.

In particular, when the tape cassette 12 is inserted into the cassette holder 9 and the cassette holder 9 is pushed into the tape recorder in order to load the tape cassette 12 into the tape recorder, the tape cassette 12 will press against the abutting projection 16 of the ejecting member 15a to move the ejecting member 15a in the cassette loading direction until the abutting projection 16 finally presses against the abutting extension 22 of the arresting member 21a. As a result, the arresting member 21a is pivoted around the shaft 14 to move the arresting portion 24 thereof out of engagement with the upright piece 23 to allow the cassette holder 9 to be moved downwardly as described above. In this instance, just when the arresting portion 24 of the arresting member 21a is brought out of engagement with the upright piece 23 of the main base plate 1, the projection 53 of the arresting member 21a is fitted into the recess 54 as seen in FIG. 2. On the other hand, when the ejecting member 25 is pushed into the tape recorder in order to unload the tape cassette 12 from the tape recorder, the pivoting end of the arresting member 21a is moved up and consequently the arresting portion 24 of the arresting member 21a is arrested completely by the upright piece 23 (that is, after the ejecting spring 20 has been turned over). Just when the arresting portion 24 is completely arrested by the erected piece 23, the projection 53 of the arresting member 21a is drawn out of the recess 54 of the ejecting member 15.

Meanwhile, the projection 52 does not interfere with back and forth movement of the ejecting member 15a in the cassette loading and unloading directions and is located, when the ejecting member 15a is at its advanced position as shown in FIG. 3, in an opposing spaced relationship from the side wall of the ejecting member 15a by a distance t2 smaller than a distance t1 which is required to allow the arresting portion 24 of the arresting member 21 to be disengaged from the erected piece 23.

With the construction described above, operation to load and unload a tape cassette is quite similar to that of the conventional arrangement as described hereinabove with reference to FIGS. 4 to 13. However, when no tape cassette is loaded in the tape recorder, that is, when the cassette holder 9 is at the lifted rest position, the ejecting member 15 is at the advanced position due to the urging force of the ejecting spring 20 as described above. Accordingly, the projection 52 formed on the arresting member 21a is opposed to the side wall of the ejecting member 15 in a spaced relationship by the distance t2 which is smaller than the distance t1. Therefore, even if a pivoting force in a direction to disengage the arresting portion 24 of the arresting member 21a from the upright piece 23 is applied to the arresting member 21a due to an impact force from outside or by some other reasons when the cassette holder 9 is at the rest position, such pivotal motion of the arresting member 21a is limited to the distance t2 which is smaller than the distance t1 required to disengage the arresting portion 24 from the upright piece 23. Accordingly, even if an external impact force is applied, the cassette holder 9 will never be moved to the lowered operative position.

Further, with the construction described above, if the ejecting operating member 25 is pushed into the tape recorder in order to remove the tape cassette 12 received in the cassette holder 9, when the arresting portion 24 of the arresting member 21a is arrested by the upright piece 23, or more strictly when the arresting portion 24 of the arresting member 21a is completely arrested by the upright piece 23, the projection 53 of the arresting member 21a is drawn out of the recess 54 of the ejecting member 15a. At a point of time when the projection 53 is drawn out of the recess 54, the ejecting spring 20 has been turned over already. Accordingly, after the projection 53 has been drawn out of the recess 54, the ejecting member 15a starts its advancing movement to eject the tape cassette 12.

As apparent from the foregoing description, according to the present invention, since the arresting member for holding the cassette holder to the rest position is held from movement by the ejecting member when the ejecting member is at its advanced position, possible movement of the cassette holder to the operative position by an external impact force applied thereto when the cassette holder is at the rest position can be prevented positively with all the simple construction of the cassette holding device. Accordingly, the shock resistance during transportation and during normal use of the tape recorder can be improved without increase of the cost of the entire tape recorder, and protection of the cassette holder and a tape cassette and facility in use of the tape recorder can be improved.

Further, according to the invention, in whatever manner the ejecting operating member is operated, the ejecting member starts ejection of a tape cassette only after the cassette holder has been brought to the rest position. Accordingly, a possible disadvantage which may occur when the ejecting member achieves an ejecting operation before the cassette holder has been brought to the rest position can be prevented assuredly, and accordingly not only protection of the cassette holder, the capstan shafts, a tape cassette and so on can be attained but also the facility in use of the tape recorder can be improved.

Having now fully described the invention, it will be apparent to one of ordinary skill in the art that many changes and modifications can be made thereto without departing from the spirit and scope of the invention as set forth herein.

What is claimed is:

1. A cassette holding device for a tape recorder, comprising a cassette holder for removably receiving a tape cassette therein, said cassette holder being coupled to a base plate for movement between an operative position in which recording on or reproduction from a tape within a tape cassette received therein can be achieved and a rest position, spring means for urging said cassette holder toward the operative position, an arresting member mounted on said cassette holder for selective back and forth movement between an advanced position and a retracted position, stationary arresting means located on said base plate for engagement with said arresting member at the advanced position to arrest said cassette holder to the rest position, an ejecting member coupled to an end of said spring means and mounted for back and forth movement between an advanced position and a retracted position on said cassette holder, said ejecting member being retracted by an inserting force of a tape cassette inserted into said cassette holder to disengage said arresting member from said stationary arresting means while accumulating a spring force in said spring means, said ejecting member being advanced, when allowed, by the accumulated spring force to push back the tape cassette in a direction to unload the tape cassette, and means on said ejecting member for limiting, when said ejecting member is at the advanced position, movement of said arresting member away from the advanced position to maintain the engagement of said arresting member with said stationary arresting means.

2. A cassette holding device for a tape recorder, comprising a cassette holder for removably receiving a tape cassette therein, said cassette holder being coupled to a base plate for movement between an operative position in which recording on or reproduction from a tape within a tape cassette received therein can be achieved and a rest position, spring means for urging said cassette holder toward the operative position, an arresting member pivotally mounted on said cassette holder for selective back and forth movement between an advanced position and a retracted position, stationary arresting means located on said base plate for engagement with said arresting member at the advanced position to arrest said cassette holder to the rest position, an ejecting member coupled to an end of said spring means and mounted for back and forth movement between an advanced position and a retracted position on said cassette holder, said ejecting member being retracted by an inserting force of a tape cassette inserted into said cassette holder to disengage said arresting member from said stationary arresting means while accumulating a spring force in said spring means, said ejecting member being advanced, when allowed, by the accumulated spring force to push back the tape cassette in a direction to unload the tape cassette, and means for preventing, when said arresting member is at the retracted position in which said arresting member is disengaged from said stationary arresting means, movement of said ejecting member away from the retracted position toward the advanced position and for allowing, when said arresting member is advanced to the advanced position via the movement of said ejecting member in which said arresting means engages with said stationary arresting means, movement of said ejecting member away from the retracted position to the advanced position.

* * * * *